C. McBurney,
Hose Coupling.
N°41,630.  Patented Feb 16, 1864.
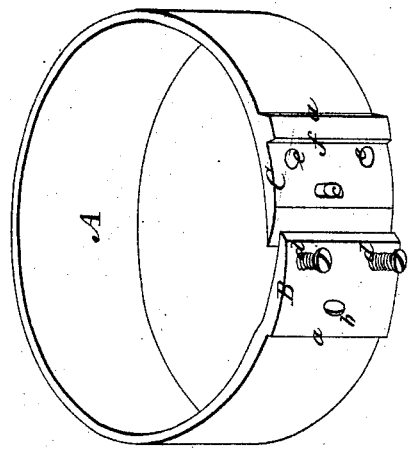
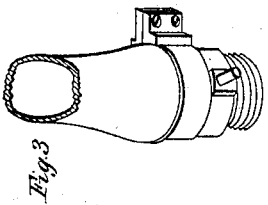
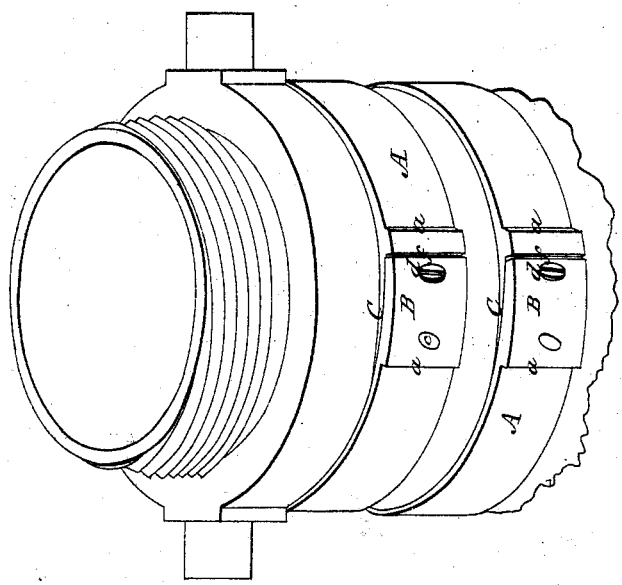
Witnesses:
Thos. R Roach
B. Tesehmacher
Inventor:
Charles McBurney

UNITED STATES PATENT OFFICE.

CHARLES McBURNEY, OF ROXBURY, MASSACHUSETTS.

IMPROVED MODE OF FASTENING HOSE TO COUPLINGS.

Specification forming part of Letters Patent No. 41,630, dated February 16, 1864.

*To all whom it may concern:*

Be it known that I, CHARLES McBURNEY, of Roxbury, in the county of Norfolk and State of Massachusetts, have invented an Improved Clamp for Securing Hose to Couplings, of which the following is a full, clear, and exact description, reference being had to the accompanying drawings, making part of this specification, in which—

Figure 1 represents a hose-coupling with the hose attached by means of my improved clamp; Fig. 2, a view of the clamp detached; Fig. 3, a view showing the ordinary clamp now in use.

Various methods have been adopted for securing hose to couplings; but to all of them there is more or less objection. Clamps are used with projecting ends or flanges, which unite around the outside of the hose and secure it in place by tightening one or more screws. This clamp is objectionable on account of the projections catching in the pavement, or other obstructions, and it is also heavy and clumsy to handle. Again, where the hose is put over a ring provided with a shoulder at its inner end, and then wire wrapped around it, it becomes almost impossible to belay the wire sufficiently tight. Another plan is to slip a solid ring over the hose, leaving the end of the latter to extend a little beyond the ring and then to insert the scored end of the coupling within the hose. Where leather hose is used it is first soaked to soften it, so that the scored end of the coupling may screw into it, but where rubber hose is used it is impossible to screw in the coupling.

My invention consists of a clamp or strap one of the ends or laps of which is provided with a projecting nib that slips into a hole made in the other end, the nib being kept in its place by one or more screws passing through the laps.

To enable others skilled in the art to make and use my invention, I will now proceed to describe the manner in which I have carried it out.

In the accompanying drawings, A is my improved clamp, near the two lapping ends of which are formed the shoulders $a\ a$. The end B of the clamp is provided with a hole, $b$, and the end C has a projecting nib, $c$, which fits into the hole $b$ when the clamp is secured around the hose. $d\ d$ are screws passing through holes in the overlap B, and $e$ are corresponding holes in the inner lap, C. Another shoulder, $f$, is formed on the inner lap, and both laps are beveled off so as to slide over and fit each other evenly.

The clamp is first put loosely around the hose until the end of the coupling is inserted, and when the hose is properly fitted thereto the shoulders $a\ a$ are pressed toward each other by a vise, of a form adapted to the work, until the nib $c$ slips into the hole $b$, where it is kept securely in place by means of the screws $d\ d$ passing through holes in both of the laps and holding the hose firmly to its coupling.

My improved strap is applicable to all kinds of hose, but is adapted more particularly to india-rubber hose. One broad clamp with two screws, as shown in Fig. 2, may be used, or two or more narrow ones with one screw each, as the case may require.

What I claim as my invention, and desire to secure by Letters Patent, is—

The within-described clamp, with its nib $c$ and hole $b$ secured in place by one or more screws, $d$, substantially in the manner and for the purpose specified.

C. McBURNEY.

Witnesses:
 THOS. R. ROACH,
 P. E. TESCHEMACHER.